(No Model.) 2 Sheets—Sheet 1.
E. DENSMORE.
MACHINE FOR CUTTING VENEERS.
No. 347,331. Patented Aug. 17, 1886.
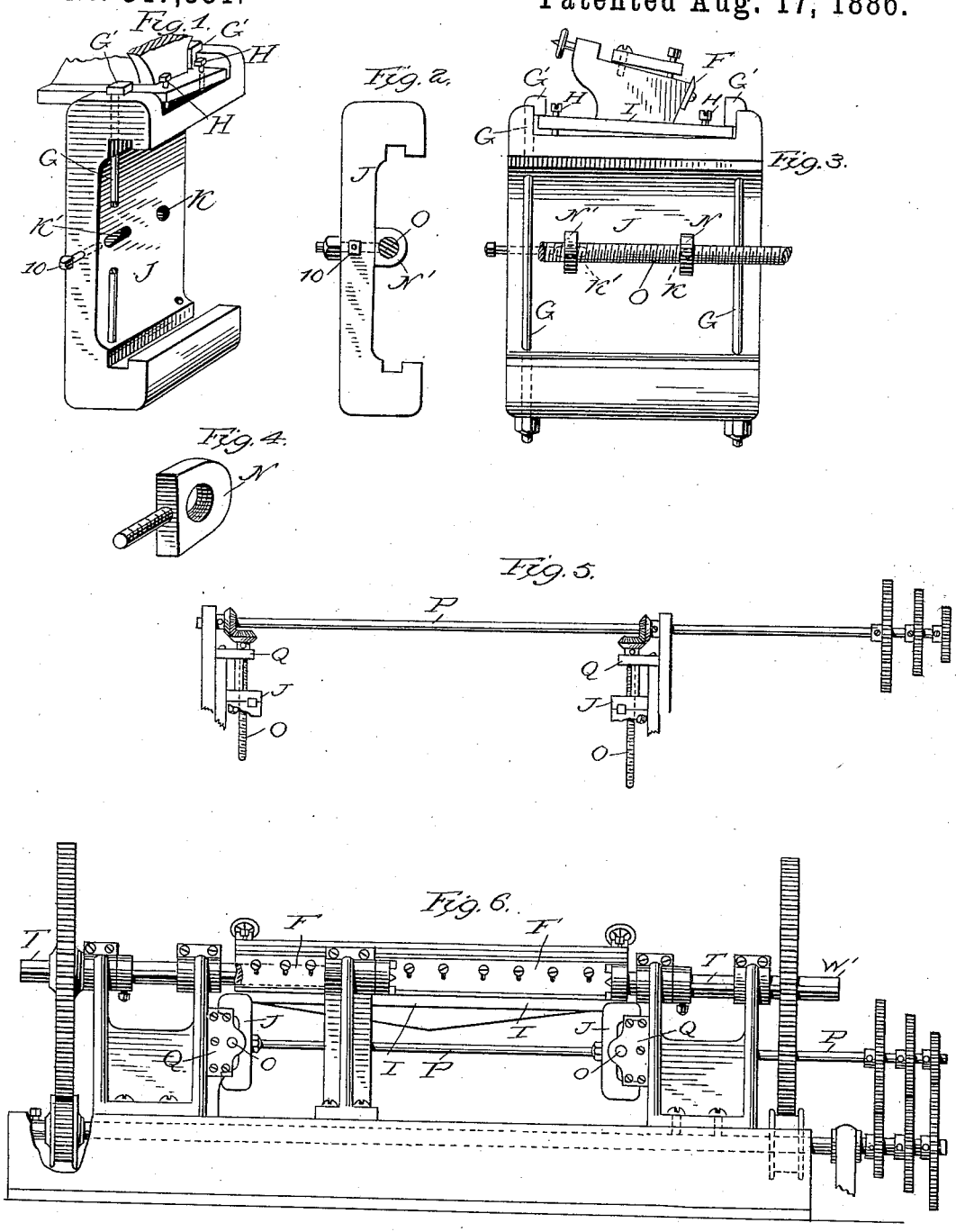
Attest
Walter Donaldson
F. L. Middleton
Inventor
Edwin Densmore
by Joyce & Spear
Attys.

(No Model.) 2 Sheets—Sheet 2.
E. DENSMORE.
MACHINE FOR CUTTING VENEERS.
No. 347,331. Patented Aug. 17, 1886.
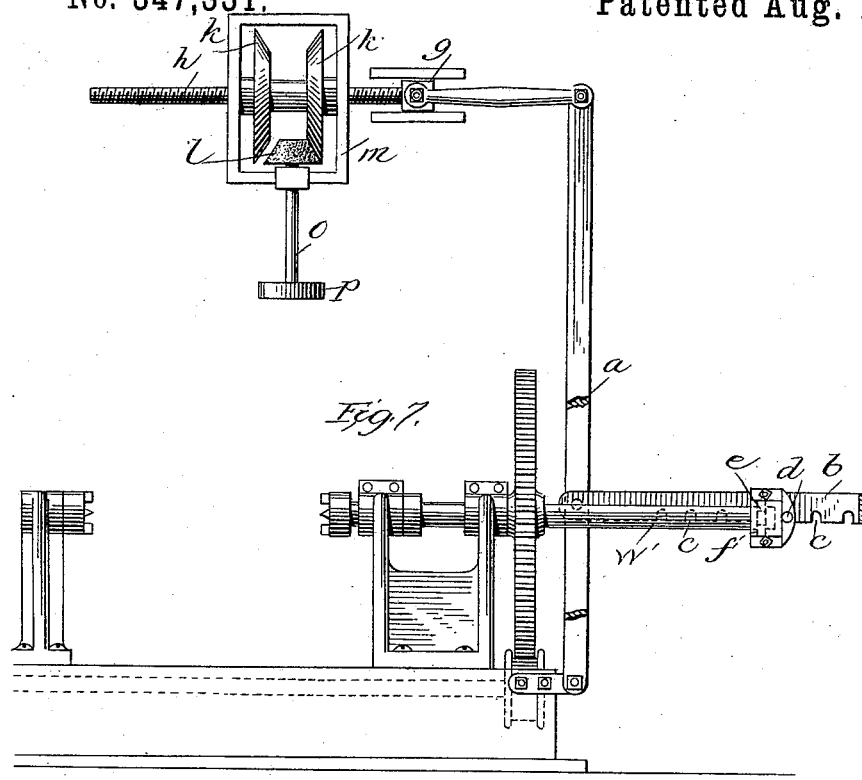
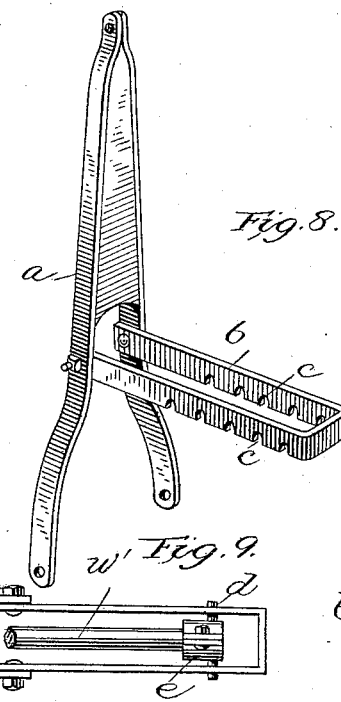
Attest:
Walter Macaason
F. L. Middleton
Inventor
Edwin Densmore
by Joyce & Spear
Attys.

UNITED STATES PATENT OFFICE.

EDWIN DENSMORE, OF GRAND RAPIDS, MICHIGAN.

MACHINE FOR CUTTING VENEERS.

SPECIFICATION forming part of Letters Patent No. 347,331, dated August 17, 1886.

Application filed January 13, 1886. Serial No. 188,466. (No model.)

*To all whom it may concern:*

Be it known that I, EDWIN DENSMORE, of Grand Rapids, in the county of Kent and State of Michigan, have invented a new and useful Improvement in Machines for Cutting Veneers; and I do hereby declare that the following is a full, clear, and exact description of the same.

My invention relates to machines for cutting veneers.

My object, first, is to guard against any lost motion in the mechanism for advancing or adjusting the knife to the wood; secondly, to improve the mechanism for varying the inclination of the knife to the wood; and, thirdly, to provide means for adjusting the shaft which carries the log by power applied through the driving mechanism.

In the accompanying drawings, Figure 1 is a perspective view, Fig. 2 an end view, and Fig. 3 a face view, of one of the sliding blocks on which the knife-bar is carried. Fig. 4 shows the nut in which the feed-screw works. Fig. 5 is a plan view of the feed-screws with their supports and counter-shaft. Fig. 6 represents a front view of the machine. Fig. 7 represents in side elevation the mechanism whereby the power which drives the machine is applied to move the log-shaft longitudinally to release or clamp a log. Figs. 8 and 9 represent details of Fig. 7.

I have thus fully illustrated the machine in order to show clearly the application of my invention, but shall confine my description mainly to the parts which are new and of my invention.

The machine is organized to cut veneers from a log, which is rotated on the shaft T, driven by cog-wheels in the ordinary manner. The knife F is attached to the knife-bar I. This knife-bar is carried on the sliding blocks J, which move on guide-rails fixed on the brackets Q at each end of said rails. These blocks are moved by screws O O, which turn on bearings in the brackets Q and pass through the nuts on the blocks, one being a right and the other a left hand screw. They are connected to the shaft P by bevel-gears.

On the blocks J are two nuts, N and N'. The nut N has a shank, as shown in Fig. 4, which fits snugly in a hole, K, in the block. The shank of the other nut, N', passes loosely through a horizontal slot, K', in the block, on the same horizontal line with the hole for the nut N. The nut N' is held firmly in place by means of a nut on its shank, which is jammed against the rear of the block and holds by frictional contact. When only one nut N is used, as heretofore, any looseness of fit caused inevitably by wear renders the adjustment inaccurate and the position of the log unsteady. This renders it necessary to replace the nuts as soon as any appreciable wear occurs. This necessity, however, is obviated by the use of the movable nut N', which may be set up toward the nut N, so as to press against the threads, and thus act constantly as a jam-nut to prevent any lost motion. The nut N' may be adjusted as often as required, and the nuts may be used until the threads are worn out without impairing the accuracy of the movement of the log toward the knife. I may use any known or suitable means for pressing the nut N' upon the threads.

For the purpose of pressing the nut N' toward the nut N, I use a set-screw, 10, tapped into the slot at right angles thereto, so as to press against the shank of the nut N'.

In adjusting the nut N' the nut on its shank is loosened and the set-screw 10 turned up to give the proper tension. Then the nut is turned upon the shank and the nut N held in place.

The knife-bar I is held to the blocks J by means of bolts G, the heads G' of which project over the edges of the plate. These bolts are drawn down by nuts underneath the blocks. Set-screws H are threaded through the bar I and bear on the blocks, and by turning these either on the front or rear, with corresponding movement of the bolts G, the bar may be tipped or inclined and set at any desired angle to give the proper inclination to the knife. This construction affords easy adjustment, and also holds the knife-bar easily clamped.

The shaft W' of Fig. 6 is shown as prolonged in Fig. 7. This is a movable part of the log-shaft, and heretofore has been moved longitudinally by hand, and requires considerable force to drive the clamp into the log or to remove therefrom. A forked lever, a, straddles the shaft and is pivoted to the frame below it. It carries a yoke, b, having notches c, locking over pins d on the sleeve e, held to the end of the shaft by a collar, f, so that the shaft W' may turn therein, but must move longitudinally with the sleeve. The series of notches are to suit different lengths of log. The upper end of the forked lever is linked to a sliding block, $g$, on the end of the screw $h$. This screw is threaded through the connected hub of two bevel friction-gears, $k\ k$, set reversed to each other. Between these gears is another, $l$, on an axis whose bearing is hung in a frame, $m$, and slides thereon. The gear $l$ is less in diameter than the space between the bearing-surfaces of the gears $k\ k$, and by sliding the bearing of $l$ the gear may be thrown into connection with one or the other. The shaft $o$ of the gear $l$ has a pulley, $p$, for a band connected to the driving-power, and the shaft may be moved to shift the gear by direct application of the hand, or by any other desired means. The frame carries the screw and gears K K, and is suspended from the ceiling. By shifting the gear $l$ the power applied through the pulley and gear $l$ is exerted on the lever, and moves the shaft out to release the log, or in to clamp the same.

I claim as my invention—

1. In combination with the sliding blocks which carry the knife-bar of a veneer-cutting machine, a fixed nut and a movable nut set in each of said blocks, screws for moving the blocks, connected to operating mechanism and passing through the fixed and movable nuts, whereby the knife is moved toward the wood, and means, substantially as described, for pressing the movable nuts to cause them to bear against the threads of the screws, and to compensate for the wear and secure accurate work, all substantially as described.

2. In combination with the sliding blocks which carry the knife-bar of a veneer-cutting machine, the nuts N, having shanks set in holes in the block, the nuts N', set in slots in the block, the nuts being in line with and receiving the screws which move the blocks and the knife, and the set-screw 10, adapted to press against the shanks of the gear $l$ and to prevent any inaccurate movement of the blocks, all substantially as described.

3. In combination with the blocks J, the mechanism for moving them, the knife-bar I, carried upon the blocks, bolts G, having heads projecting over the edges of the plates, and the set-screw H, threaded through the bar I, whereby by the movement of the bolts and screws the bar may be tipped to any desired angle to give the proper inclination to the knife, substantially as described.

4. In combination with the log-shaft W', movable longitudinally in its bearings, a lever pivoted at one end and extending across the said shaft, a yoke connecting the said lever to the sleeve on the shaft, which sleeve is held against longitudinal movement on the shaft, but permits it to turn therein, and intermediate mechanism connecting the free end of the lever with the driving-power, whereby the driving-power may be used to clamp or release the log, substantially as described.

5. In combination with the shaft W', movable longitudinally to clamp or release the log, the lever $a$, connected to the yoke, having a series of notches adapted to pins on the sleeve in which the shaft turns, whereby movement of the lever imparts longitudinal movement to the shaft, a screw connected to the lever $a$, bevel-gears $k\ k$, threaded on said screw, and the shifting bevel gears between the gears $k\ k$, mounted upon a frame adapted to be connected with the driving mechanism, whereby the moving-power for driving the machine may be utilized to draw the shaft W' out of connection with the log, or to force it against the log, substantially as described.

In testimony whereof I have signed my name to this specification in the presence of two subscribing witnesses.

EDWIN DENSMORE.

Witnesses:
F. L. MIDDLETON,
CHAS. L. STURTEVANT.